UNITED STATES PATENT OFFICE.

HORACE BILLINGS, OF BEARDSTOWN, ILLINOIS.

IMPROVEMENT IN ROOFING-CEMENT.

Specification forming part of Letters Patent No. 15,275, dated July 8, 1856.

*To all whom it may concern:*

Be it known that I, HORACE BILLINGS, of Beardstown, in the county of Cass and State of Illinois, have invented a new and improved composition of matter which can be used to great advantage as a water-proof and fire-proof coating for roofs, and also as a coating for telegraph-posts, fence-posts, and the surfaces of other exposed articles to protect them from the injurious effects of air and moisture; and I do hereby declare that the following is a full and exact description thereof.

The said composition of matter is prepared by combining the following ingredients with each other in substantially the manner hereinafter set forth—to wit: Place in a suitable vessel fifty pounds of shellac, (or seed-lac,) one hundred and twenty pounds of rosin, (or its equivalent,) and ten quarts of linseed-oil, (or its equivalent,) and thoroughly incorporate said ingredients with each other by the application thereto of heat, and subjecting the mass to a suitable degree of agitation. Then add to the said melted mass somewhere from one hundred and fifty to one hundred and eighty pounds of powdered steatite or soapstone, and thoroughly incorporate the same therewith by suitable agitation. When thus formed my said improved composition of matter is ready for use, provided it be kept at a proper temperature.

Roofs that are to be rendered water-proof by the use of the aforesaid composition should first be prepared for its reception by a suitable preliminary covering.

As an additional protection against fire, sand or gravel may be worked into the coating of said composition immediately after it has been spread upon a roof.

Articles to be protected from the injurious effects of air and water may receive a thin coating of the said melted composition, either directly upon their surfaces or upon a preliminary covering placed thereupon.

The exterior surface produced by the use of the said improved composition of matter is as hard as stone, is perfectly impervious to the action of air and water, and is believed to be entirely fire-proof.

The proportions of the respective ingredients employed in the production of my said improved composition of matter may be somewhat varied without essential injury. The proportion of steatite used in said composition must be varied to suit the particular purpose for which the composition is to be employed.

Having thus fully described my improved composition of matter and its uses, I would observe that a cement composed of gum-shellac, rosin, and linseed-oil, in substantially the proportions herein set forth, was secured to me by a patent bearing date the 9th day of April, 1850, reissued March 25, 1851, and that my present invention consists merely in adding powdered steatite or soapstone to the aforesaid cement, by which a composition is produced that forms a tough, elastic, and very durable water-proof outer coating for roofs, &c., but is not adapted to the protection of meats, &c., like the cement described in my patent aforesaid. Therefore,

What I claim as my invention, and desire to secure by Letters Patent, is—

My improved roof-coating cement or composition of matter produced by combining shellac, (or seed-lac,) rosin, linseed-oil, (or its equivalent,) and powdered steatite, (or its equivalent,) in proportions which will give the said composition the character and adapt it to the purposes substantially as herein set forth.

The above specification of my improved cement to be used in the formation of protecting outer coatings for roofs and other surfaces signed this 2d day of April, 1856.

HORACE BILLINGS.

Witnesses:
JAS. C. LEONARD,
E. P. CHASE.